UNITED STATES PATENT OFFICE.

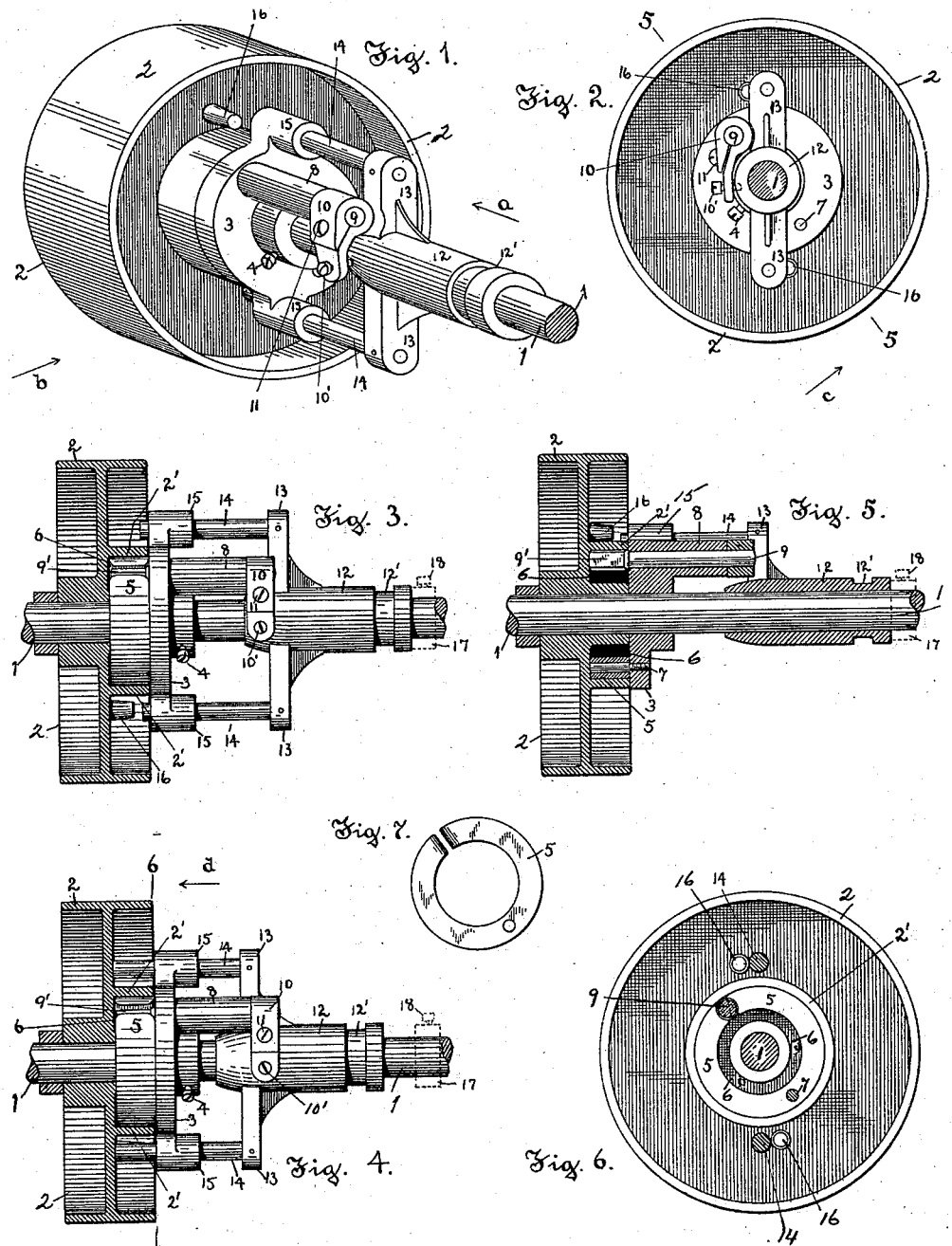

WILLIAM H. EDDY, OF WORCESTER, MASSACHUSETTS.

CLUTCH MECHANISM.

SPECIFICATION forming part of Letters Patent No. 578,733, dated March 16, 1897.

Application filed March 19, 1896. Serial No. 583,920. (No model.)

*To all whom it may concern:*

Be it known that I, WILLIAM H. EDDY, a citizen of the United States, residing at Worcester, in the county of Worcester and State of Massachusetts, have invented certain new and useful Improvements in Clutch Mechanism, of which the following is a specification.

My invention relates to clutch mechanism to be applied to shafts, pulleys, &c.; and the object of my invention is to provide an improved clutch mechanism, and more particularly a combined friction and positive clutch mechanism of simple construction and operation.

My invention consists in certain novel features of construction of my improved clutch mechanism, as will be hereinafter fully described.

I have shown in the drawings my positive-clutch mechanism combined with my patented friction-clutch mechanism shown and described in United States Letters Patent, granted to me September 25, 1883, No. 285,593, to which reference is hereby made.

Referring to the drawings, Figure 1 is a perspective end view of a shaft and a pulley provided with my said patented friction-clutch mechanism and my positive-clutch mechanism combined therewith. Fig. 2 is an end view looking in the direction of arrow $a$, Fig. 1. Fig. 3 is a side view looking in the direction of arrow $b$, Fig. 1. The pulley is shown in section. Fig. 4 corresponds to Fig. 3, except that the clutch mechanism is in the opposite position to clutch the pulley on the shaft. Fig. 5 is a central section on line 5 5, Fig. 2, looking in the direction of arrow $c$, same figure. Fig. 6 is a cross-section on line 6 6, Fig. 4, looking in the direction of arrow $d$, same figure; and Fig. 7 is the expansion friction-ring detached.

In the accompanying drawings, 1 is a shaft, and 2 a belt-pulley loose thereon. A disk 3 is attached to the shaft 1 by a set-screw 4 and bears against one end of the hub of the pulley 2. (See Fig. 5.) An expansion-ring 5 extends in an annular groove 6, formed in this instance on one side of the pulley 2 by an annular flange 2' thereon, extending around and at some distance from the hub thereof. (See Fig. 6.) The ring 5 is attached by a screw or pin 7 to the disk 3 (see Fig. 5) to revolve in the annular groove 6 with the disk 3 and shaft 1.

Extending out from the disk 3 is a hub 8, through which extends a rotating spindle 9, the inner end of which is provided with a flat blade 9', which extends between the ends of the ring 5. The outer end of the spindle 9 is provided with an arm or dog 10, which is adjustably secured thereon by a screw 11. A collar or cone 12 slides on the shaft 1 and is provided with a circumferential groove 12' therein for the engagement of the shipping device. (Not shown.)

The tapering part of the cone 12 passes beneath the arm or "dog" 10, provided with an adjusting-screw 10', which slides on said cone as the same is moved longitudinally on the shaft 1 and causes the spindle 9 to rotate and the flat blade 9' thereon to expand the ring 5 when the cone 12 is moved toward the pulley 2 and causes the exterior surface of the ring 5 to come in frictional contact with the inner surface of the flange 2' on the pulley 2 and cause said pulley to revolve with said ring, secured to the disk 3, fast on the shaft 1, as above stated.

When the cone 12 is moved in the opposite direction away from the pulley 2, the elasticity of the ring 5 will cause the ends thereof to approach each other and rotate the spindle 9 in the opposite direction to lower the arm or dog 10 preparatory to its being again engaged by the cone 12.

All of the parts above described are of substantially the same construction and operation as similar parts shown and described in my said patent.

I will now describe the construction and operation of the parts forming my positive-clutch mechanism, which in this instance I have shown combined with my patented friction-clutch mechanism.

The sliding cone 12 is provided with two oppositely-extending arms 13, in this instance made integral therewith, and in the outer end of each arm is secured one end of a rod or pin 14. Each pin 14 extends at right angles to the arms 13, and the end of each pin extends loosely through a hub 15 on the disk 3, in this instance made integral therewith.

Two projections or lugs 16 extend out from the side of the pulley 2, on opposite sides of the hub thereof, and extend in the path of the two pins 14 (see Fig. 6) when said pins are moved in toward the pulley 2 by the sliding of the cone 12, as shown in Fig. 4.

The pins 14, extending loosely through the hubs 15 on the disk 3, fast on the shaft 1, cause the cone 12 to turn with the shaft, but allow it to slide longitudinally thereon. In order to prevent the pins 14 from being drawn out of the hubs 15, a collar 17 is secured by a set-screw 18 on the shaft 1. (See broken lines, Fig. 3.) The ends of the pins 14 and lugs 16 may be made slightly tapering, so as to lessen the frictional contact thereof when they are disengaged.

It will be seen that the sliding pins 14, being attached to the disk 3, fast on the shaft 1, by passing through the hubs 15 thereon, must revolve with said shaft, so that when said pins are positively moved in by the sliding of the cone 12 on the shaft 1 and to extend in the path of and engage the lugs 16 on the pulley 2 said pulley is in positive engagement with said pins 14 and must revolve with the shaft 1 without regard to its frictional engagement with said shaft.

The operation of my positive-clutch mechanism, in connection with my patented friction-clutch mechanism shown in the drawings, will be readily understood by those skilled in the art. Supposing the shaft 1 to be revolving and it is desired to cause the belt-pulley 2, loose thereon, to revolve with said shaft, the cone 12 is moved on the shaft 1 toward the left in the drawings, causing the arm 10 to move up on the tapering end of the cone and rotate the spindle 9 to cause the flattened end 9' thereof to spread the ends of the expansion-ring 5 and bring said ring in frictional engagement with the flange 2' on the pulley 2, as above described, to start the pulley slowly at first. After the pulley is started the continued movement of the cone 12 brings the pins 14 into the path of the lugs 16 on the pulley 2, and the greater speed of the shaft 1 causes the pins 14 to engage with the lugs 16 on the pulley and make a positive connection between the shaft and pulley. The starting of the pulley by the friction-clutch mechanism before the engagement of the pins 14 and lugs 16 of the positive-clutch mechanism prevents any sudden jar or movement of the pulley.

In case the ends of the pins 14 and lugs 16 should happen to butt against each other as the cone 12 is moved toward the pulley a slight movement of the cone in the opposite direction will lessen the frictional engagement of the pulley with the shaft, so that the greater speed of the shaft will carry the ends of the pins 14 by the ends of the lugs 16, and the return movement of the cone 12 will allow said pins to engage in the proper manner.

By using oppositely-projecting pins for locking the parts together the possibility of their ends engaging with each other and preventing their locking is reduced to a minimum, whereas with a pin entering a hole the chances of the end of the pin entering the hole when it is thrust forward is reduced to a minimum, and the result is that the end of the pin must be held against the side of the pulley-hub while it is making a partial revolution, and in a short time the hub and the pin are both so worn as to be very defective, if not useless.

To unclutch the pulley from the shaft, the cone 12 is moved to the right in the drawings, causing the pins 14 and lugs 16 to be disengaged and the friction-clutch mechanism to operate to release the pulley.

If only one pin 14 and one lug 16 were used instead of two, the result would not be quite as satisfactory, for with two pins 14 and lugs 16, arranged on opposite sides of the shaft, I have a double bearing and cause the pulley to revolve truer on the shaft and with less wear of the hub thereof.

The advantages of my positive-clutch mechanism combined with a friction-clutch mechanism will be readily appreciated by those skilled in the art. It is of simple construction, and no matter how much the pulley slips on the shaft by reason of the wear of the friction-clutch mechanism or for any other reason it must revolve with the shaft and at the same speed because of the positive engagement of the pins 14 and lugs 16, as above described, and, further, the pins 14 are positively moved into or out of the path of the lugs 16, extending out from the side of the loose pulley, and no springs are required.

It will be understood that the pulley may be the driver instead of the shaft, and the shaft may be clutched to the pulley instead of the pulley to the shaft, as above described.

Having thus described my invention, what I claim as new, and desire to secure by Letters Patent, is—

In a clutch mechanism, the combination, with a shaft, of a pulley journaled thereon, one side or face of which is provided with an annular groove and two diametrically opposite pins, an expansion-ring secured to the side of the hub within the groove, a disk adjacent to the hub and provided with three hollow hubs, one of which is within the groove and the other two are arranged diametrically opposite to each other and are located in line with the pins of the pulley, a rotatable spindle within one of the hubs, one end of which is provided with a flat plate that fits between the ends of the expansion-ring, and the opposite end of which is provided with an arm, and a sliding cone upon the shaft, the inner or tapering end of which is provided with two oppositely-extending arms, the outer end of each arm being provided with a laterally-extending pin, said pins projecting through the diametrically oppositely-arranged hubs so as to engage with the pins on the pulley, and the end of the cone engaging with the arm upon the spindle, substantially as set forth.

WILLIAM H. EDDY.

Witnesses:
JOHN C. DEWEY,
M. J. GALVIN.